United States Patent
Engel

(10) Patent No.: US 9,188,428 B2
(45) Date of Patent: Nov. 17, 2015

(54) COORDINATE MEASURING MACHINE WITH SELECTIVELY ACTIVE WHITE LIGHT SENSOR

(71) Applicant: Carl Zeiss Industrielle Messtechnik GmbH, Oberkochen (DE)

(72) Inventor: Thomas Engel, Aalen (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 13/959,906

(22) Filed: Aug. 6, 2013

(65) Prior Publication Data
US 2014/0043468 A1 Feb. 13, 2014

Related U.S. Application Data

(63) Continuation of application No. PCT/EP2012/065475, filed on Aug. 7, 2012.

(60) Provisional application No. 61/680,504, filed on Aug. 7, 2012.

(51) Int. Cl.
*H04N 9/47* (2006.01)
*G01B 11/14* (2006.01)
(Continued)

(52) U.S. Cl.
CPC .............. *G01B 11/14* (2013.01); *G01B 11/005* (2013.01); *G01B 11/03* (2013.01); *G01B 11/245* (2013.01)

(58) Field of Classification Search
USPC ........................................................ 348/135
See application file for complete search history.

(56) References Cited

U.S. PATENT DOCUMENTS 5,181,108 A * 1/1993 Greene .......................... 348/61
6,822,749 B1 * 11/2004 Christoph .................... 356/609
(Continued)

FOREIGN PATENT DOCUMENTS

DE 198 16 270 A1 10/1999
DE 103 40 803 A1 3/2005
(Continued)

OTHER PUBLICATIONS

ISA/EP; English language translation of International Preliminary Report on Patentability (Chapter 1); issued by WIPO Feb. 10, 2015; 7 pp.

(Continued)

*Primary Examiner* — Dave Czekaj
*Assistant Examiner* — Leron Beck
(74) *Attorney, Agent, or Firm* — Harness, Dickey & Pierce, P.L.C.

(57) ABSTRACT

A coordinate measuring machine for measuring a measurement object, comprising a workpiece support for supporting the measurement object and a measuring head carrying an optical sensor. The measuring head and the workpiece support are movable relative to one another. The optical sensor has an objective and a camera for capturing an image of the measurement object. The objective has a light entrance opening and a light exit opening, and comprises a multitude of lens-element groups arranged in the objective between the light entrance opening and the light exit opening one behind another along a longitudinal axis of the objective. A clearance is provided in the objective between the first and second lens-element groups. The coordinate measuring machine furthermore has a white light sensor and a partly reflective coupling element that is selectively moveable into the clearance for coupling the white light sensor into the objective.

17 Claims, 8 Drawing Sheets

(51) Int. Cl.
*G01B 11/00* (2006.01)
*G01B 11/03* (2006.01)
*G01B 11/245* (2006.01)

(56) References Cited

U.S. PATENT DOCUMENTS

| | | | | |
|---|---|---|---|---|
| 2003/0130562 | A1* | 7/2003 | Barbato et al. | 600/109 |
| 2008/0165329 | A1* | 7/2008 | Murata et al. | 353/94 |
| 2010/0014099 | A1 | 1/2010 | Christoph et al. | |
| 2011/0080576 | A1 | 4/2011 | Thiel et al. | |
| 2012/0008930 | A1* | 1/2012 | Barley et al. | 396/155 |

FOREIGN PATENT DOCUMENTS

| WO | WO 2006/063838 A1 | 6/2006 |
|---|---|---|
| WO | WO 2009/049834 A2 | 4/2009 |
| WO | WO 2009/121922 A1 | 10/2009 |

OTHER PUBLICATIONS

International Search Report and Written Opinion of the International Searching Authority for PCT/EP2012/065475 (in German with English Translation), mailed Mar. 28, 2013; ISA/EP.

* cited by examiner

COORDINATE MEASURING MACHINE WITH SELECTIVELY ACTIVE WHITE LIGHT SENSOR

CROSS-REFERENCE TO RELATED APPLICATIONS

This application is a continuation of International PCT application No. PCT/EP2012/065475, filed Aug. 7, 2012. This application also claims the priority of U.S. provisional application No. 61/680,504, filed Aug. 7, 2012. The entire contents of these priority applications are incorporated herein by reference.

BACKGROUND OF THE INVENTION

The present invention relates to a coordinate measuring machine for measuring a measurement object, comprising a workpiece support for supporting the measurement object, comprising a measuring head carrying an optical sensor, wherein the measuring head and the workpiece support are movable relative to one another, wherein the optical sensor has a objective and a camera, which is designed to capture an image of the measurement object through the objective, wherein the objective has a light entrance opening and a light exit opening, wherein the objective has a multitude of lens-element groups which are arranged in the objective between the light entrance opening and the light exit opening one behind another along a longitudinal axis of the objective.

The use of optical sensors in conjunction with coordinate measuring machines makes it possible in many cases to measure geometrical properties of a measurement object very rapidly. One disadvantage of known coordinate measuring machines comprising optical sensors heretofore has been that the optical sensors are limited to specific measurement tasks and specific workpiece properties. The optical sensors are generally optimized for a specific type of measurement task, for instance with regard to the achievable measurement accuracy or the measurement range. Problems can be posed for example by workpieces which have large height differences parallel to the optical axis of the sensor. In part, different optical and/or tactile sensors are used in order to be able to react flexibly to different measurement requirements, wherein the individual sensors in each case perform only part of the overall measurement task. In general, each individual sensor is optimized towards a specific measurement task. Primarily optical sensors therefore have a respective individual optics which is well suited to a specific purpose of use and is less well suited to other purposes.

By way of example, coordinate measuring machines comprising a white light sensor have been proposed. Such a coordinate measuring machine is disclosed by the document DE 103 40 803 A1, for example.

Most of the confocal white light sensors used are point sensors. These sensors achieve a depth resolution in a range of less than 1 µm to approximately 20 mm. A resolution in such an operating range can typically be represented by approximately 15 bits. Such sensors are used to perform precise measurements along scanning paths on a measurement object. Often, measurement results of these sensors are combined with camera images. The advantages of fast surface information and very accurate depth information can be combined in this way. Embodiments in which a plurality of measurement channels or measurement points are arranged alongside one another are also known. However, the individual measurement points generally have a relatively large lateral distance, with the result that a measurement with a genuine, solid line is not possible.

On the other hand, it has also been proposed to direct a line of white light onto a measurement object. In this case, the different colours of the light within the available spectrum are imaged into different depths. The light reflected by the measurement object is subsequently analysed spectrally and a respective measurement point is assigned the depth value as measurement value for which the reflected spectral light distribution has its maximum value.

As explained in the document DE 103 40 803 A1, such white light sensors are arranged in addition to the other optical sensors on the carrier structure of the coordinate measuring machine.

The provision of different sensors for different measurement tasks in a coordinate measuring machine makes possible a high flexibility in conjunction with a high measurement accuracy. The high costs for the provision of the numerous sensors with in each case a dedicated optics adapted to the purpose of use of the sensor are disadvantageous. Furthermore, the large number of sensors with in each case a dedicated optics require a relatively large structural space in the coordinate measuring machine, which restricts the measurement volume and causes further costs.

There is a desire to provide an optical coordinate measuring machine which can perform a large range of optical measurement tasks in conjunction with comparatively low costs. Accordingly, it is an object of the present invention to specify a corresponding coordinate measuring machine and a corresponding method.

SUMMARY OF THE INVENTION

According to one aspect of the invention, it is therefore provided a coordinate measuring machine for measuring a measurement object, comprising a workpiece support for supporting the measurement object, comprising a measuring head carrying an optical sensor, wherein the measuring head and the workpiece support are movable relative to one another, wherein the optical sensor has a objective and a camera, which is designed to capture an image of the measurement object through the objective, wherein the objective has a light entrance opening and a light exit opening, wherein the objective has a multitude of lens-element groups which are arranged in the objective between the light entrance opening and the light exit opening one behind another along a longitudinal axis of the objective, and wherein a first lens-element group from the multitude of lens-element groups is arranged in a stationary fashion in the region of the light entrance opening, wherein there is a clearance in the objective between the first and a second lens-element group, and wherein the coordinate measuring machine furthermore has a white light sensor and an at least partly reflective coupling element for coupling the white light sensor into the objective, said coupling element selectively being movable into the clearance.

In the context of the present application, a "white light sensor" should be understood to mean a sensor which irradiates the measurement object with light having a specific wavelength spectrum and which determines a position of at least one point of the measurement object parallel to the longitudinal axis by evaluation of an intensity distribution of the light in the wavelength spectrum that is reflected or scattered by the measurement object and detected by the sensor. A longitudinal chromatic aberration caused by the imaging of the light and the different vertex focal lengths of each wavelength that result therefrom are used in this case. It is not mandatory in this case for the white light sensor actually to use white light, that is to say a wavelength spectrum of approximately 380 nm to approximately 780 nm. The white light sensor can also use only a partial range of this wavelength spectrum and/or adjacent wavelengths in the ultraviolet range below 380 nm and/or in the infrared range above 780 nm.

In the context of the present invention, a "coupling element" is understood to mean an optical element which at least partly reflects incident light, i.e. at least a fraction of incident light is reflected. In principle, the coupling element can completely reflect incident light, i.e. can be a mirror. In one preferred configuration, the coupling element is a beam splitter, however. A beam splitter can be designed in such a way that it reflects 50% of incident light and allows through or transmits 50% thereof. In this way, an incident light beam can be split into two light beams having the same intensity.

In this configuration, between the first lens-element group and the displaceable second lens-element group there is a defined minimum distance that cannot be undershot by the second lens-element group. The clearance makes it possible to accommodate a beam splitter in the optical beam path and/or to introduce the chromatic assembly into the objective between the first lens-element group and the second lens-element group. The configuration increases the flexibility of the new objective since, in particular, it also facilitates the coupling-in of defined illuminations for different sensor principles.

Therefore, the first lens-element group is, in particular, that lens-element group of the objective which is arranged furthest on the object side. The second lens-element group is then a lens-element group of the objective that is closest, in particular, on the image side of the first lens-element group. The clearance is situated between the first and second lens-element groups. The coupling element is selectively movable in said clearance. Consequently, it is possible selectively to couple the white light sensor optically into the objective between the first and second lens-element groups. If the coupling element is embodied as a beam splitter, a simultaneous use of a two-dimensional image evaluation by means of the camera and an evaluation by the white light sensor become possible in this way. This is all accomplished with a compact construction and a common beam path onto the measurement object.

The movability of the coupling element makes it possible, moreover, to move the coupling element completely out of the clearance, such that it does not influence the beam path in the objective between the first and second lens-element groups. The full intensity of the light incident through the first lens-element group can then be made available for the further beam path onto the camera.

In this way, it becomes possible, in a coordinate measuring machine comprising a two-dimensionally measuring optical sensor, to provide a white light sensor in a compact design for parallel or else alternative use.

In one refinement of the invention it can be provided that the coordinate measuring machine has a collimation element between the first lens-element group and the coupling element.

The collimation element serves for generating a better collimated beam of rays from the convergent or divergent incident beam of rays downstream of the first lens-element group. After passing through the collimation element, an at least largely collimated beam of rays is then present, which can significantly simplify the optical further processing of the incident light.

In a further refinement it can be provided in this case that the collimation element has at least one optical element selected from a group consisting of a refractive optical element, a diffractive optical element and a holographic optical element.

Furthermore, it is also conceivable, in principle, for the collimation element to be formed by a plurality of optical elements selected from an arbitrary combination of refractive, diffractive and holographic optical elements.

Each of the abovementioned types of optical elements can be advantageous in certain applications. A collimation element formed from at least one refractive optical element can be producible cost-effectively for example as, if appropriate, a spherical objective. A diffractive or holographic optical element may have a smaller space requirement, in particular parallel to the longitudinal axis or the optical axis of the objective.

By means of the collimation element is it possible, in principle, to keep the diameter of the beam of rays small after passing through the first lens-element group. In particular, for this purpose, the collimation element can be arranged near the first lens-element group. This results in a smaller diameter of the beam of rays and a smaller size of downstream optical elements in the beam path to the white light sensor, in particular of the coupling element and, as will be explained below, of a chromatic assembly.

In a further refinement of the coordinate measuring machine it can be provided that the collimation element is movable together with the coupling element.

The collimation element and the coupling element can therefore jointly form a movable or pivotable part of the white light sensor, which is selectively movable between the first and second lens-element groups into the beam path of the objective.

This makes possible a construction that is simple in terms of design and control engineering. Furthermore, in the case where the white light sensor is not used, the collimation element can also be moved from the beam path and the full light intensity on the camera can be used.

In a further refinement of the coordinate measuring machine it can be provided that the coordinate measuring machine furthermore has a beam guiding optics for guiding light from the beam splitter to an evaluation unit of the white light sensor.

The beam guiding optics makes it possible to guide that portion of the light incident in the objective which is coupled out by means of the coupling element as desired from the objective body towards an evaluation unit of the white light sensor. In particular in the case of the use of optical fibres for guiding the light, a coupling of the portion of light into the optical fibre can be established by means of the beam guiding optics.

In a further refinement of the coordinate measuring machine it can be provided that the beam guiding optics is movable together with the beam splitter and guides light from the beam splitter into an optical fibre arranged in such a way that it optically connects the beam guiding optics to an evaluation unit and a light source of the white light sensor.

In this way it becomes possible to arrange the evaluation unit and a light source of the white light sensor within the coordinate measuring machine, but at a distance from the objective. Possible evolutions of heat in a light source then influence the objective and do not influence the camera, for example. Moreover, what can be achieved in this way is, for example, that the light source and the evaluation unit can be arranged in a stationary manner and do not have to participate in a relative movement between workpiece carrier and measuring head if the measuring head itself is movable.

The light source of the white light sensor need not necessarily involve "white light". Therefore, light in the entire visible spectrum from approximately 380 to 780 nm need not necessarily be emitted. It is also possible to use only partial ranges of this spectrum or a multitude of specific wavelengths. Moreover, it is possible, in principle, to use wavelength ranges in the ultraviolet or infrared spectrum, for example in a range of 300 to 380 nm or 780 to 850 nm. All that is important for the functionality of the white light sensor is that the light source does not operate monochromatically, but rather provides a multitude of wavelengths or a wavelength range.

In a further refinement of the coordinate measuring machine it can be provided that the white light sensor has a beam splitter, which combines a beam path of light emitted by the light source in a beam path of light incident on the evaluation unit.

A compact construction of light source evaluation unit that is simple optically and in terms of design can be provided in this way.

In a further refinement of the coordinate measuring machine it can be provided that the first lens-element group is embodied in an achromatic fashion.

In this case, "achromatic" should be understood to mean that the first lens-element group is corrected with regard to chromatic aberrations. In particular, the first lens-element group causes no longitudinal chromatic aberration whatsoever. A transverse chromatic aberration can also be corrected.

In principle, it is desired for the objective of a two-dimensional optical sensor to have a high imaging quality. This is also understood to mean that no chromatic aberrations whatsoever occur. In this case, it has proved to be advantageous to chromatically correct each lens-element group by itself.

In the present coordinate measuring machine, too, the first lens-element group can be embodied in an achromatic fashion. Although a longitudinal chromatic aberration of the beam of rays incident on the measurement object is necessary for the functionality of a white light sensor, this longitudinal chromatic aberration must also be brought about in a different way since parts of the white light sensor are pivoted into the beam path of the objective anyway. This makes it possible, if the pivotable part of the white light sensor is not situated in the beam path, furthermore to operate with a chromatically corrected first lens-element group.

As has already been explained above, the "first lens-element group" is understood to mean the lens-element group arranged furthest on the object side, if appropriate behind a cover glass.

In a further refinement of the coordinate measuring machine it can be provided that each lens-element group of the multitude of lens-element groups is embodied in an achromatic fashion.

As has already been explained above, this leads to an overall chromatically corrected objective which can have neither longitudinal chromatic aberrations nor transverse chromatic aberrations.

In a further refinement of the coordinate measuring machine it can be provided that the measuring machine furthermore has at least one chromatic assembly which is movable into the clearance.

In principle, it can be provided that only a single chromatic assembly is provided in the coordinate measuring machine. Said assembly can then also be movable together with the coupling element into the clearance. In the context of the present invention, a "chromatic assembly" is understood to mean at least one optical element which brings about a longitudinal chromatic aberration.

The chromatic assembly thus makes it possible to introduce a longitudinal chromatic aberration into the beam path only selectively if the white light sensor is also intended to be used. Furthermore, it is also possible to provide a plurality of chromatic assemblies, a respective one of which is movable into the clearance. In this way, it is possible to influence the amount of longitudinal chromatic aberration or the vertex focal length difference between the longest and shortest wavelengths and thus an operating region parallel to the longitudinal axis or the optical axis of the objective.

In one refinement of the coordinate measuring machine it can be provided that the chromatic assembly consists of a single dispersion element for bringing about a longitudinal chromatic aberration.

In principle, a single dispersion element can suffice to bring about the desired longitudinal chromatic aberration.

With the use of a single dispersion element, there arises parallel to the longitudinal axis only a small required structural space required for being able to arrange the optical elements proposed between the first lens-element group and the second lens-element group.

In one refinement of the coordinate measuring machine it can be provided that the dispersion element is a diffractive optical element or a holographic optical element.

The refinement of the dispersion element as a diffractive optical element or holographic optical element likewise makes possible a compact design within the clearance between the first and second lens-element groups parallel to the longitudinal direction of the objective.

In a further refinement it can be provided that the objective has a diaphragm and at least four lens-element groups, wherein the diaphragm and a second lens-element group, a third lens-element group and a fourth lens-element group from the at least four lens-element groups are displaceable relative to the first lens-element group along the optical axis or the longitudinal axis, wherein the second lens-element group is arranged between the first lens-element group and the diaphragm, and wherein the third and fourth lens-element groups are arranged between the diaphragm and the light exit opening.

In this way, a objective is provided in which at least four separate lens-element groups are arranged on a common optical axis. The first lens-element group (as viewed from the light entrance opening or front side) is stationary. Behind it there follow along the optical axis three further lens-element groups, which are in each case displaceable relative to the first lens-element group along the optical axis. Optionally, the objective in some refinements has a fifth lens-element group, which is arranged in the region of the light exit opening and is stationary. The lens-element groups together generate an image on an image sensor coupled to the objective via the interface. On account of the individual displaceability of the three lens-element groups, the new objective can be set to different imaging conditions very flexibly. As explained below on the basis of a preferred exemplary embodiment, the new objective makes possible, in particular, a variable setting of the magnification and a variable setting of the operating distance. In the preferred exemplary embodiments, the new objective is telecentric over the entire setting range of the magnification and over the entire setting range of the operating distance, which can be achieved very well with the aid of the axially displaceable diaphragm. The individual adjustability of the three lens-element groups furthermore makes it possible to realize a constant magnification over the entire variation range of the operating distance or a constant focussing to an operating distance over the entire magnification range. These properties make it possible for the first time to measure a measurement object having great height differences parallel to the optical axis of the objective with constant parameters, without the optical sensor as such having to be moved nearer to the measurement object or further away from the measurement object. This last makes possible very fast measurements at a multitude of measurement points. The stationary first lens-element group furthermore has the advantage that the "disturbing contour" of the optical sensor in the measurement volume of the coordinate measuring machine is always the same. The risk of the sensor colliding with the measurement object is reduced. Furthermore, the variable settability makes it possible to dispense with changeable optics, which were used in part in previous coordinate measuring machines in order to perform different measurement tasks.

In a further refinement, the first, second, third and fourth lens-element groups in each case consist of at least two lens elements. In the preferred exemplary embodiments, each lens-element group comprises at least one cement element, i.e. at least two individual lens elements in each of the four lens-element groups are connected permanently and over a large area along their optically active surfaces.

This refinement reduces the number of interfaces and therefore contributes to a high imaging quality over a large spectral operating range. In one preferred exemplary embodiment, the four lens-element groups merely form fourteen interfaces.

In a further refinement of the coordinate measuring machine it can be provided that at least two lens-element groups are displaceable parallel to the longitudinal axis.

In this way, the possibility can be afforded, for example, that a focussing of the objective and thus an operating distance of the optical sensor or of the camera can be varied or even an imaging scale of the objective can be varied.

In a further refinement, the objective has a separate cover glass, which is arranged upstream of the first lens-element group in the region of the light entrance opening.

In this refinement, light which enters into the beam path of the objective via the light entrance opening firstly impinges on the cover glass and only afterwards passes through the series of lens-element groups to the light exit opening. The arrangement of a separate cover glass upstream of the first lens-element group is an unusual measure for measurement objects since the cover glass in any case influences the optical properties of the objective or the beam path thereof. In the preferred exemplary embodiments, the optical properties of the cover glass are therefore taken into account in the correction of the lens-element groups, that is to say that the cover glass is included in the overall correction of the objective. The provision of a separate cover glass upstream of the first lens-element group is unusual particularly if the first lens-element group is designed or used for generating a defined longitudinal chromatic aberration, which is the case in preferred exemplary embodiments of the new objective. However, the refinement has the advantage that a separate cover glass can be more easily cleaned and exchanged, if appropriate, if the light entrance opening of the objective is soiled or even damaged during everyday operation. Accordingly, the new objective in preferred exemplary embodiments is designed such that the separate cover glass is held reversibly and non-destructively releasably in the objective body.

In a further refinement it can be provided that the coordinate measuring machine has a diffractive optical element or a holographic optical element that forms both the collimation element and the dispersion element.

In particular, it can be provided that this diffractive or holographic optical element is likewise movable together with the coupling element into the clearance.

The diffractive or holographic optical element is helpful for a compact design of the coordinate measuring machine since it can provide both a refractive power for collimating the light beam and a dispersion or longitudinal chromatic aberration, and in this way it is thus possible to save axial structural space in the objective.

In a further refinement it can be provided that an assembly which has said optical element and is pivotable into the clearance is likewise embodied as an at least partly reflective component. For this purpose, by way of example, the coupling element can be pivotable together with said optical element. In particular, the diffractive optical element can be a blazed grating. A blazed grating has a maximum diffraction efficiency for a desired wavelength range. In this case, the wavelength range can correspond to the spectrum emitted by the light source.

In this way, it is once again possible to achieve overall a compact design in the axial direction, i.e. parallel to the longitudinal direction of the objective. For the use of the collimation element already downstream of the first lens-element group and before a significant beam expansion, all subsequent assemblies, i.e. the beam guiding optics, the beam splitter and the chromatic assembly, or the dispersion element, can likewise be embodied with smaller optical diameters. This can in turn minimize the space requirement parallel to the longitudinal direction of the objective since, in the case of refractive optical elements used, the centre thicknesses in the case of convex lens-element surfaces and/or the edge thicknesses in the case of concave lens-element surfaces are small on account of the transversely smaller diameter.

In a further refinement, the first and second lens-element groups together form a focal point lying between the second and third lens-element groups, wherein the control curve for the diaphragm and the control curve for the second lens-element group are coordinated with one another such that the diaphragm is always arranged at the focal point.

This refinement ensures for the new objective, despite the flexible variation possibilities, an at least object-side telecentricity over all magnifications and operating distances. The object-side telecentricity is advantageous in order to determine in particular the depth of bores, projections or recesses on a measurement object because the "view" of the measurement object is largely constant despite the different operating distances in these cases. A perspective distortion of the measurement object is advantageously avoided by virtue of an object-side telecentricity.

In a further refinement, the diaphragm has a variable diaphragm aperture, which preferably varies in a manner dependent on the position of the diaphragm along the optical axis.

In this refinement, the new objective has a further degree of freedom, namely the aperture of the diaphragm. This makes it possible to vary the numerical aperture of the objective and thus to vary the achievable resolution of the objective. In preferred exemplary embodiments, the abovementioned control curves including the individual control curve for the diaphragm aperture are embodied such that the objective offers an operating mode with a constant image-side aperture over different operating distances. This operating mode is advantageous in order to be able to operate with a constantly high measurement accuracy over different operating distances.

In the preferred exemplary embodiments, the diaphragm is situated centrally with respect to the optical axis, to be precise with a centring error that is less than 20 μm and is preferably less than 10 μm. The diaphragm is preferably an iris diaphragm that is drivable individually in a motor-operated manner, wherein the driving is effected using a control curve belonging to the set of curves mentioned above. These exemplary embodiments enable a simple implementation and a constantly high measurement accuracy over the entire operating range.

In a further refinement, the objective has a multitude of slides and motor-operated drives, wherein the second, third and fourth lens-element groups and the diaphragm are in each case coupled to a dedicated slide that is adjustable along the optical axis, and wherein the slides are individually movable with the aid of the motor-operated drives.

In this refinement, the elements that are adjustable along the optical axis are in each case coupled to a dedicated drive. In some exemplary embodiments, the drive is a stepper motor, which preferably operates in full-step operation since this results in a low heat input into the objective. The refinement enables a modular and comparatively cost-effective realization. As an alternative, it is also possible to use DC motors, either in an embodiment with brushes or in a brushless embodiment.

In a further refinement, the first lens-element group has a positive refractive power. Preferably, the second lens-element group has a negative refractive power, the third lens-element group has a positive refractive power and the fourth lens-element group has a negative refractive power.

In practical experiments this refinement has proved to be very advantageous for achieving a compact design and a small disturbing contour of the objective in the measurement volume of the new coordinate measuring machine.

In further exemplary embodiments, a stripe pattern or some other structured illumination can be coupled in via the further interface, and is analysed for example on the basis of the image captured by the camera in order to measure a measurement object. Preferably, a further clearance is provided between the fourth lens-element group and the light exit opening of the objective, a beam splitter likewise being arranged in said further clearance. A third interface is preferably arranged at the level of the further beam splitter, such that the input and output coupling of illumination and/or signals is also possible downstream of the optical system comprising the four lens-element groups. The flexibility and the scope of use of the new objective and of the corresponding coordinate measuring machine are thus increased even further.

In a further refinement it can be provided that the objective and the white light sensor are designed in such a way that a numerical aperture of the objective is less than a numerical aperture of the white light sensor.

By way of example, the objective can be designed for a numerical aperture of approximately 0.2. The white light sensor, which is coupled in, in particular, between the first lens-element group and the second lens-element group of the objective and thus uses the first lens-element group, can be designed with a numerical aperture of 0.4 up to 0.7. With the use of the white light sensor, this enables shorter operating distances and an even higher resolution than with a normal use of the entire objective.

It goes without saying that the features mentioned above and those yet to be explained below can be used not only in the combination respectively indicated, but also in other combinations or by themselves, without departing from the scope of the present invention.

BRIEF DESCRIPTION OF THE DRAWINGS

Exemplary embodiments of the invention are illustrated in the drawing and are explained in greater detail in the following description. In the figures.

DETAILED DESCRIPTION OF THE PREFERRED EMBODIMENT

Figure 1:
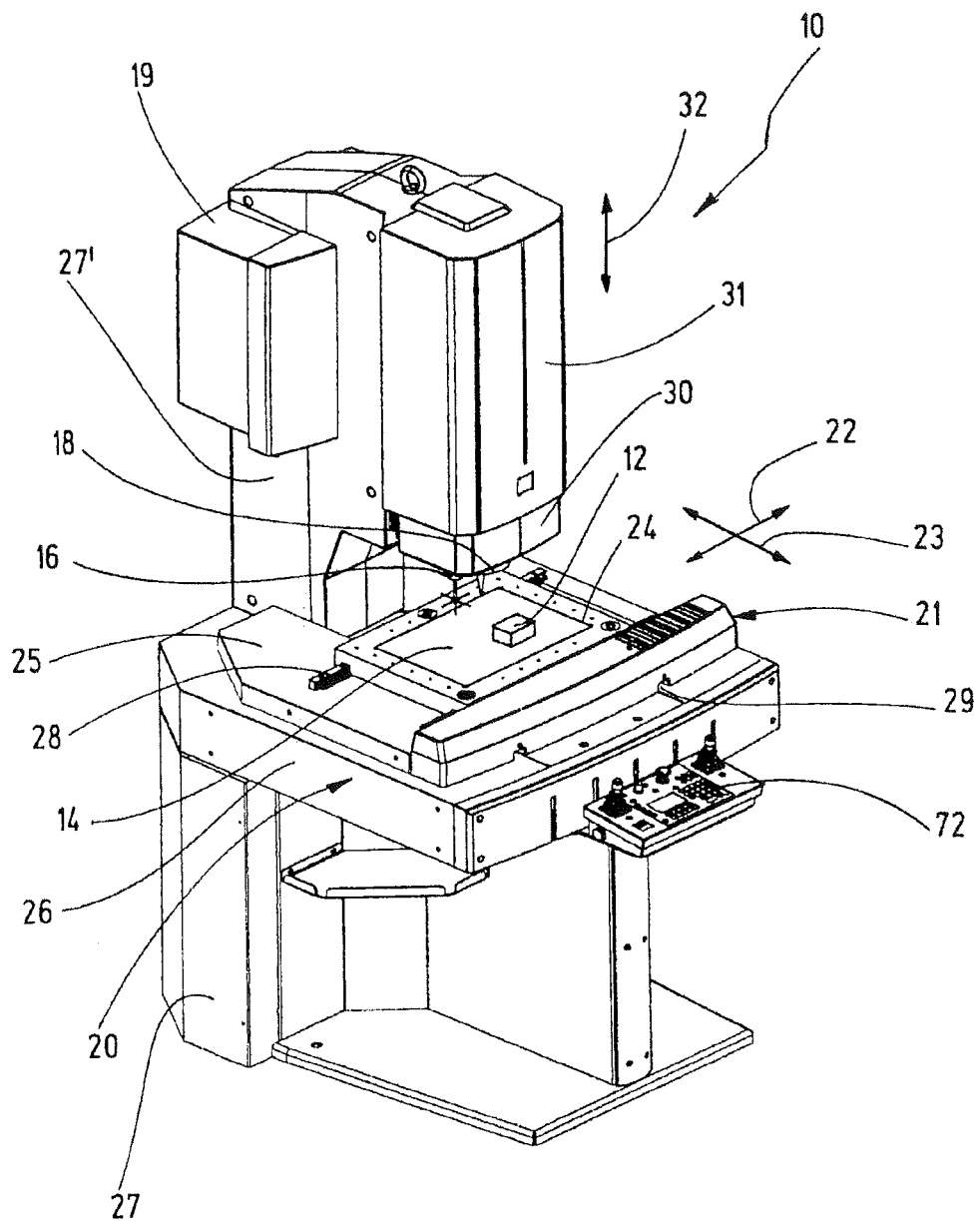
FIG. 1 shows an exemplary embodiment of a coordinate measuring machine in a view obliquely from the front.

FIG. 1 shows an apparatus 10 for inspecting a measurement object 12 arranged on a workpiece carrier 14. In the embodiment illustrated, the apparatus 10 is a coordinate measuring machine. The measurement object 12 is measured by means of one or a plurality of optical sensors 18. Selectively, one or a plurality of tactile sensors 16 can additionally also be provided.

Coordinate measuring machines are generally known in the prior art. They are used, for example in the context of quality assurance, to check workpieces or to determine the geometry of a workpiece completely in the context of so-called "reverse engineering". Furthermore, a wide variety of further application possibilities are conceivable, thus for example including the additional use for inspecting surfaces.

In such coordinate measuring machines, different types of sensors can be used to detect the coordinates of a workpiece to be measured. By way of example, sensors that effect tactile measurement are known for this purpose, such as are sold for instance by the applicant under the product designation "VAST", "VAST XT" or "VAST XXT". In this case, the surface of the workpiece to be measured is probed with a probe pin whose coordinates in the measurement space are continuously known. Such a probe pin can also be moved along the surface of a workpiece, such that in such a measuring process in the context of a so-called "scanning method" a multitude of measurement points can be detected at defined time intervals.

Furthermore, it is known to use optical sensors which enable the coordinates of a workpiece to be detected contactlessly. One example of such an optical sensor is the optical sensor sold by the applicant under the product designation "VIS-can".

The sensors can then be used in various types of measurement setups. One example of such a measurement set-up is a table set-up, as shown in FIG. 1. One example of such a table set-up is the product "O-INSPECT" from the applicant. In such a machine, both an optical sensor and a tactile sensor are used to carry out different inspection tasks on one machine and ideally with a single clamping of a workpiece to be measured. In this way, many inspection tasks for example in medical technology, plastics technology, electronics and precision mechanics can be carried out in a simple manner. It goes without saying that, furthermore, various other set-ups are also conceivable.

Such sensor systems or sensor heads that carry both tactile and optical sensors are becoming increasingly important in coordinate measuring technology. A combination of tactile and optical sensors makes it possible to combine in a single coordinate measuring machine the advantages of the high accuracy of a tactile measuring system with the speed of an optical measuring system. Furthermore, calibration processes during sensor changes are avoided, as is possible reclamping of a workpiece.

Traditionally, the sensor head, which can also be designated as sensor system, is connected to a carrier system that supports and moves the sensor system. Various carrier systems are known in the prior art, for example gantry systems, stand, horizontal arm and arm systems, all kinds of robot systems and finally closed CT systems in the case of sensor systems operating with X-rays. In this case, the carrier systems can furthermore have system components that enable the sensor head to be positioned as flexibly as possible. One example thereof is the rotary-pivoting articulated joint from the applicant sold under the designation "RDS". Furthermore, various adapters can be provided in order to connect the different system components of the carrier system among one another and to the sensor system.

Consequently, the use of the apparatus 10 and the coordinate measuring machine 100 are not restricted to the table set-up illustrated in FIG. 1 and the corresponding carrier system, but rather can also be used with all other types of carrier systems. Furthermore, the apparatus 10 can also generally be used in multi-sensor measuring systems or in a material microscope.

The apparatus 10 furthermore has a measuring table 20. A positioning device 21 is situated on the measuring table 20. Said positioning device is provided, in particular, for positioning the measurement object 12 parallel to an X-axis 19 and to a Y-axis 23. In this case, the X-axis 19 and the Y-axis 23 span a measuring plane.

By way of example, an X-table 24 and a Y-table 25 can be provided for positioning purposes. The X-table 24 is movable parallel to the X-axis 21 and the Y-table 25 is movable parallel to the Y-axis 19. Both are arranged on a baseplate 26. The baseplate 26 is carried by a machine frame 27 and 27'.

The movement of the X-table 24 and of the Y-table 25 is guided by linear guides in the X-direction 28 and in linear guides in the Y-direction 29. This set-up corresponds to the so-called "table set-up". As already explained above, other carrier systems are also conceivable.

The apparatus 10 furthermore has a measuring head 15. One or a plurality of tactile sensors 16 can be arranged on the measuring head 15. Furthermore, the apparatus 10 is arranged on the measuring head 15. Furthermore, one or a plurality of further optical sensors 18 can also be arranged on or in the measuring head 15. The measuring head 15 therefore serves to couple the one or the plurality of optical sensors 18 and possibly a tactile sensor 16 to a carrier structure, for example a Z-slide 30. The measuring head 15 can be a closed housing construction, but it can also be embodied in an open fashion. By way of example, the measuring head 15 can also have the form of a simple plate on which the one or the plurality of optical sensors 18 and possibly the tactile sensor 16 are fixed. Furthermore, all further possible forms for coupling the one or the plurality of optical sensors 18 and possibly the tactile sensor 16 to the carrier structure are also conceivable.

The measuring head 15 is held on the Z-side 30, which is guided in a slide housing 31 parallel to a Z-axis 32. Said Z-axis 32 is perpendicular to the X-axis 22 and to the Y-axis 23. The X-axis 22, the Y-axis 23 and the Z-axis 32 thus form a Cartesian coordinate system.

The apparatus 10 furthermore has an operating console 72. The individual elements of the apparatus 10 can be driven by means of the operating console 72. Furthermore, it is possible to predetermine inputs at the apparatus 10. In principle, it can also be provided that a display device (not illustrated) is arranged in the operating console 72 or elsewhere, in order to convey measurement value outputs to a user of the apparatus 10.

Figure 2:
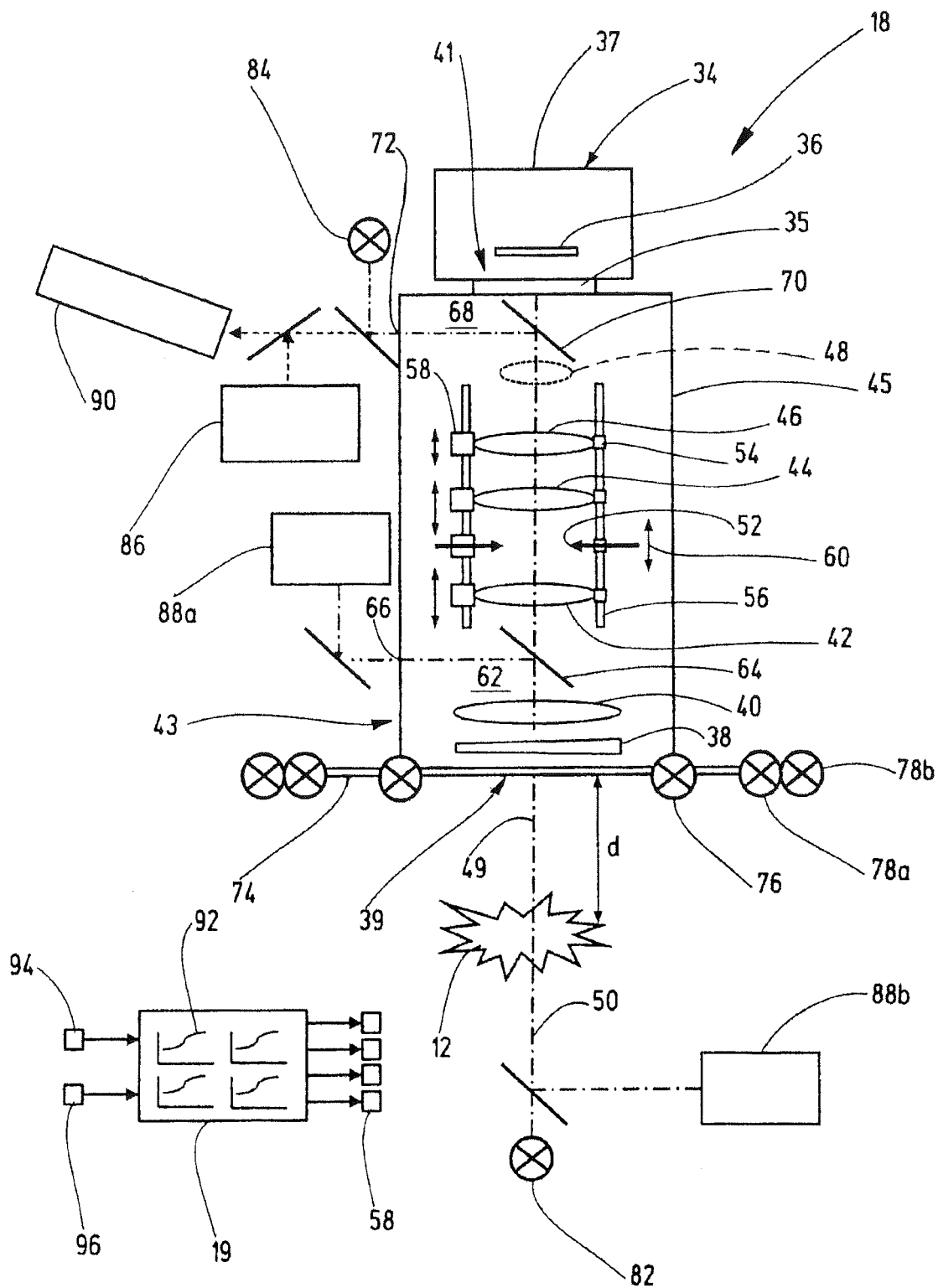
FIG. 2 shows a schematic illustration of the objective from the coordinate measuring machine from FIG. 1.

FIG. 2 shows an exemplary embodiment of the optical sensor 18, wherein the optical sensor 18 in this exemplary embodiment strictly speaking comprises a plurality of optical sensors which can be selectively present and used. The new objective can furthermore be combined with further optical sensors, for instance with a deflectometrically measuring sensor.

The sensor 18 comprises a objective 43 having a objective body 45. In typical exemplary embodiments, the objective body 45 is a tube having a light entrance opening 39 and a light exit opening 41, which are arranged at opposite ends of the tube. In principle, however, the objective body 45 can also have a form that deviates from a tube.

An interface 35 serving for connecting a camera 34 to an image sensor 36 is formed at the light exit opening 41. In preferred exemplary embodiments, the interface 35 is a standardized or widely used interface for coupling cameras and lenses, for instance a so-called F-mount or a so-called C-mount. In some exemplary embodiments, however, the interface 35 is a proprietary interface that makes it possible, in particular, to connect the housing 37 of the camera 34 directly to the objective body 45. In principle, it is also possible to use other standardized or proprietary interfaces for connecting the camera 34 to the objective body 45.

In the region of the light entrance opening 39, which defines the distal end of the objective 43, a cover glass 38 is arranged in the objective body 45 or on the objective body 45. In some exemplary embodiments, the cover glass 38 can be a screw-type glass that is screwed into a threaded mount at the distal end of the objective body 45. In other exemplary embodiments, the cover glass 38 can be pushed, clipped or adhesively bonded into a suitable cutout on the objective body 45 or can be connected to the objective body 45 in a positionally fixed fashion in some other way. In the preferred exemplary embodiments, the cover glass 38 is connected to the objective body 45 in such a way that a user of the coordinate measuring machine 10 can exchange the cover glass 38 without damaging the objective 43.

In the exemplary embodiment illustrated, the cover glass 38 is a wedge-shaped glass plate, the thickness of which increases from one edge to the other edge, as is illustrated in the simplified sectional illustration in FIG. 2. In this case, the cover glass 38 has a wedge angle chosen such that a reflection at the front side (towards the distal end of the objective 43) or the rear side of the cover glass 38 does not reach the image sensor 36 of the camera 34. In the exemplary embodiment illustrated, the cover glass 38 is arranged in such a way that its front side is inclined or lies obliquely with respect to the light entrance opening 39, while the rear side is likewise arranged slightly obliquely with respect thereto.

In other exemplary embodiments, a cover glass having plane-parallel front and rear sides could be arranged slightly obliquely with respect to the image sensor 36 and/or the optical axis (explained in even greater detail below) of the objective 43.

In further exemplary embodiments, the cover glass 38 can be realized in the form of a thin film clamped in the region of the light entrance opening 39 of the objective 43. In some exemplary embodiments, the cover glass can be polarizing, such that the light passing through is polarized, and/or the cover glass can comprise a colour filter for suppressing ambient light.

In the exemplary embodiment illustrated, a lens-element system having a first lens-element group 40, a second lens-element group 42, a third lens-element group 44 and a fourth lens-element group 46 is arranged between the cover glass 38 and the light exit opening 41 of the objective 43. In some exemplary embodiments, a fifth lens-element group is also arranged between the fourth lens-element group 46 and the light exit opening 41, said fifth lens-element group being represented here by dashed lines. The lens-element groups 40-48 are arranged in the objective body 45 one behind another between the light entrance opening 39 and the light exit opening 41 along a longitudinal axis 49 of the objective body 45. In the exemplary embodiment illustrated, a light beam that passes through the lens-element groups 40-48 in their respective middle or center experiences no deflection, such that the longitudinal axis 49 coincides with an optical axis 50 of the objective 43.

A diaphragm 52 is arranged between the second lens-element group 42 and the third lens-element group 44. In the preferred exemplary embodiments, the diaphragm 52 is an iris diaphragm, i.e. a diaphragm whose clear internal diameter can be varied.

The second, third and fourth lens-element groups 42, 44, 46 and the diaphragm 52 are in each case coupled to a dedicated slide 54 that can be moved along two guide rails 56. Furthermore, the three lens-element groups and the optical diaphragm 52 in this exemplary embodiment are in each case coupled to an electrical drive 58. With the aid of the drives 58, the second, third and fourth lens-element groups and the diaphragm 52 can be moved parallel to the optical axis 50, as is indicated on the basis of the arrows 60. In contrast thereto, the first lens-element group 40 and the optional fifth lens-element group 48 in the preferred exemplary embodiments are arranged in a stationary fashion in the objective body 45.

As can be discerned in FIG. 2, in some exemplary embodiments there is a clearance 62 between the first lens-element group 40 and the second lens-element group 42, said clearance remaining even if the second lens-element group 42 were positioned to a minimum distance with respect to the first lens-element group 40. In the preferred exemplary embodiments, a beam splitter 64 is arranged in the clearance 62 on the optical axis 50 in order selectively to couple in or out light from a further interface 66 of the objective 43. In the preferred exemplary embodiments, the second interface 66 is arranged approximately at the level of the beam splitter 64 on the lateral circumference of the objective body 45.

In a similar manner, in some exemplary embodiments of the objective 43, there is a further clearance 68, in which a beam splitter 70 is likewise arranged, between the fourth lens-element group 46 and the light exit opening 41. A further interface 72, via which light can be coupled in and/or out, is situated at the level of the beam splitter 70. In the exemplary embodiment illustrated, the beam splitter 70 is arranged between the fifth lens-element group 48 and the light exit opening 41. Alternatively or supplementarily thereto, the beam splitter 70 could be arranged between the fourth lens-element group 46 and the fifth lens-element group 48, which of course presupposes a corresponding clearance.

In preferred exemplary embodiments, the objective 43 has in the region of the light entrance opening 39 a holder 74, on which various light sources 76, 78 are arranged. In the exemplary embodiment illustrated, the holder 74 carries a ring light having a multitude of light sources 78a, 78b arranged all around the objective body 45 at different radial distances. In some exemplary embodiments, the light sources 78a, 78b are able to generate different-colored light, for instance white light, red light, green light and blue light and mixtures thereof. The light sources 78a, 78b can be used for producing different illumination scenarios at different distances in front of the light entrance opening 39. By way of example, the reference numeral 12 schematically indicates a measurement object 12 positioned at a distance d from the light entrance opening 39 of the objective 43. The distance d represents an operating distance between the objective 43 and the measurement object 12, wherein said operating distance can be set in a variable manner on the basis of the focussing of the objective 43.

In the present exemplary embodiment, the light sources 76 are light sources that are integrated into the objective body 45. In some exemplary embodiments, the light sources 76 are integrated into the objective body 45 outside the lens-element system, as is illustrated in FIG. 2. In other exemplary embodiments (alternatively or supplementarily), light sources 76 can be integrated into the objective body 45 in such a way that the light generated by the light sources 76 emerges from the objective body 45 at least through some of the lens-element groups and, if appropriate, the cover glass 38. In this case, the light entrance opening 39 is simultaneously also a light exit opening.

The light sources 76, 78 make it possible to illuminate the measurement object 12 in a variable manner in order selectively to generate bright-field and/or dark-field illumination. Both cases involve reflected light that impinges on the measurement object 12 from the direction of the objective 43.

Furthermore, in preferred exemplary embodiments, the coordinate measuring machine 10 has a further light source 82, which enables transmitted-light illumination of the measurement object 12. Accordingly, the light source 82 is arranged below the measurement object 12 or below the workpiece support of the coordinate measuring machine 10. In the preferred exemplary embodiments, therefore, the coordinate measuring machine 10 has a workpiece support 12 provided with a glass plate in order to enable the transmitted-light illumination.

Finally, the optical sensor 18 in these exemplary embodiments has a reflected-light illumination device 84, which here can be coupled to the interface 72 via a further beam splitter. The light source 84 can couple light into the entire beam path of the objective 43 via the interface 72 and the beam splitter 70. The light coupled in is projected onto the measurement object 12 here via the lens-element system of the first to fourth (fifth) lens-element groups.

In the same way, different illuminations can be coupled into the beam path of the objective 43 via the interface 66 and, in principle, also via the light exit opening 41. By way of example, a grating projector is represented by the reference numeral 86. The grating projector generates a structured light pattern which is coupled into the beam path of the objective 43 via two beam splitters and the interface 72 in this exemplary embodiment. In some exemplary embodiments, a light source can be a laser pointer with which individual measurement points on the measurement object 12 can be illuminated in a targeted manner. In other exemplary embodiments, a light source can generate a structured light pattern, for instance a stripe pattern or grating pattern, which is projected onto the measurement object 12 via the lens-element system of the objective 43.

As is illustrated in FIG. 2, the objective 43 can be combined in various ways with optical sensors which serve for optically measuring the measurement object 12 alternatively or supplementarily to the camera 34. In FIG. 2, merely by way of example, a first confocal white light sensor 88a is coupled to the interface 66. Alternatively or supplementarily, a confocal white light sensor 88b can be coupled into the illumination path for the transmitted-light illumination 82 for example via a beam splitter. The sensors 88a and 88b can carry out a punctiform measurement. As will be explained below, a new type of optical distance measurement is proposed in the present case, however, using the clearance 62.

The reference numeral 90 designates an autofocus sensor, which can be used to determine the height position of the measurement object 12 parallel to the optical axis 50 on the basis of a determination of the focal position. Furthermore, an optical measurement of the measurement object 12 is possible with the aid of the camera 34 and a suitable image evaluation, as is known to the relevant persons skilled in the art in this field.

In the preferred exemplary embodiments, the objective 43 has a wide scope of use on account of the movable lens-element groups 42, 44, 46 and the adjustable diaphragm 52. In the preferred exemplary embodiments, a multitude of control curves 92 are stored in a memory of the evaluation and control unit 19 or some other suitable storage device. In the preferred exemplary embodiments, the multitude of control curves 92 form a 2D curve set which can be used to set the magnification and the focussing of the objective 43 in numerous freely selectable combinations. In the exemplary embodiment illustrated, a user can input a desired magnification 94 and a desired focussing 96 into the evaluation and control unit 19. With the aid of the control curves 92 and in a manner dependent on the desired magnification 94 and desired focussing 96, the evaluation and control unit 19 determines individual positions of the second, third and fourth lens-element groups along the optical axis 50 and an individual position and aperture of the diaphragm 52. In some exemplary embodiments of the new method, the user can vary the operating distance d from a measurement object by varying the focussing, without the sensor 18 having to be moved relative to the measurement object with the aid of the sleeve 14. By way of example, it is thus possible to measure structures on the surface of a measurement object 12 and structures at the bottom of a bore (not illustrated here) of the measurement object 12 by means of only the focussing of the objective 43 being varied, with constant magnification, such that in one case the structure on the surface of the measurement object 12 and in the other case the structure at the bottom of the bore lies in the focal plane of the objective 43.

In other variants, with a constant or changing operating distance d, which denotes a distance between the measurement object 12 and a first disturbing contour, namely the light entrance opening 39 of the objective 43, a user can vary the magnification of the objective 43 in order that, for example, details of a measurement object 12 previously measured "from a bird's eye view" are measured again.

Furthermore, in some exemplary embodiments, a user can vary the numerical aperture of the objective 43 by opening or closing the diaphragm 52 in order in this way to achieve a constant resolution with different operating distances d. Furthermore, a user can vary the magnification, focussing, numerical aperture individually or in combination with one another in order to optimally adapt the objective 43 to the properties of the different sensors 36, 88, 90.

Figure 3:
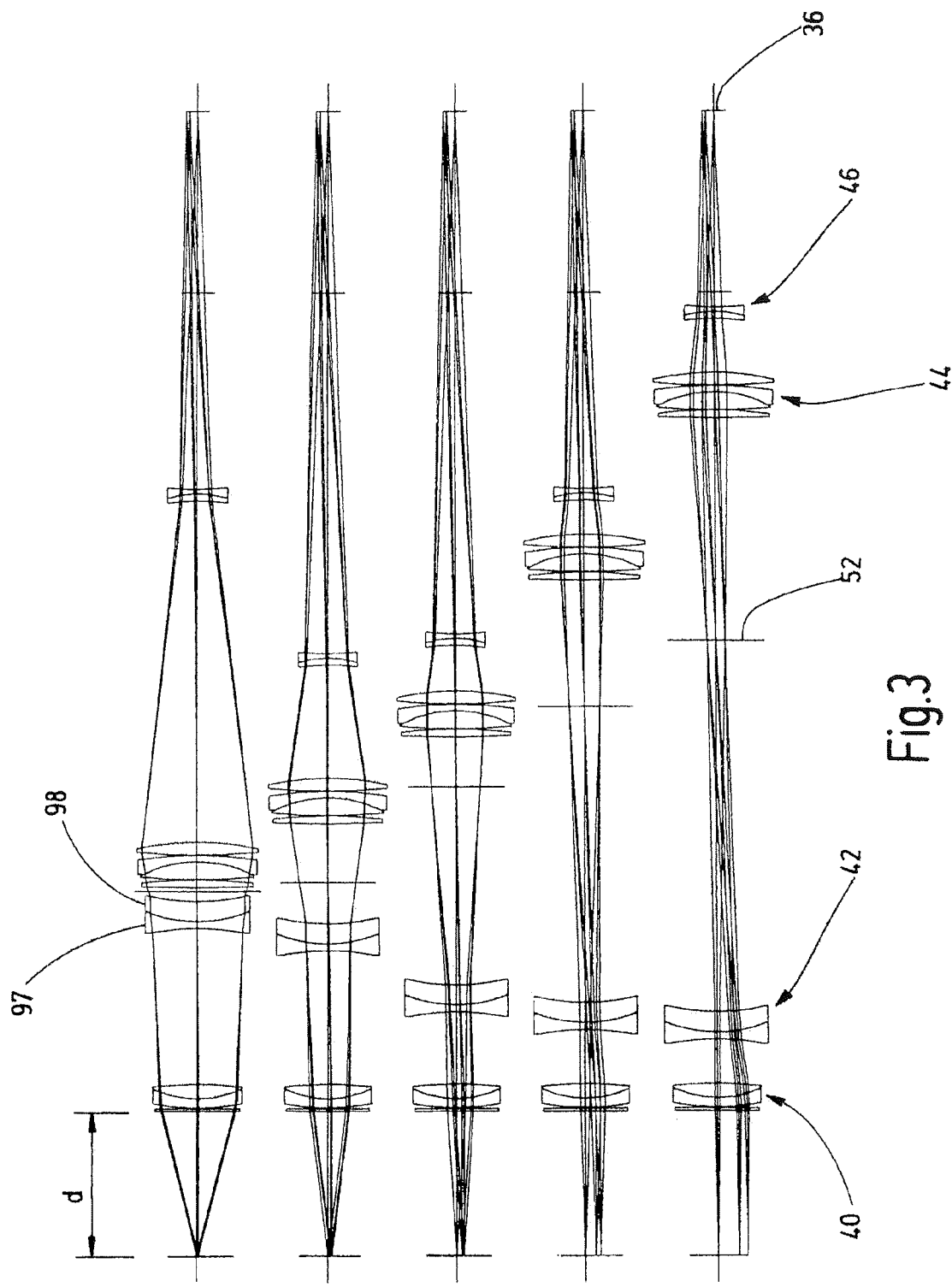
FIG. 3 shows a sectional view of the lens-element groups of the objective from FIG. 2 in accordance with one preferred exemplary embodiment, wherein the lens-element groups are illustrated in five different operating positions representing different magnifications with the same operating distance in each case.
Figure 4:
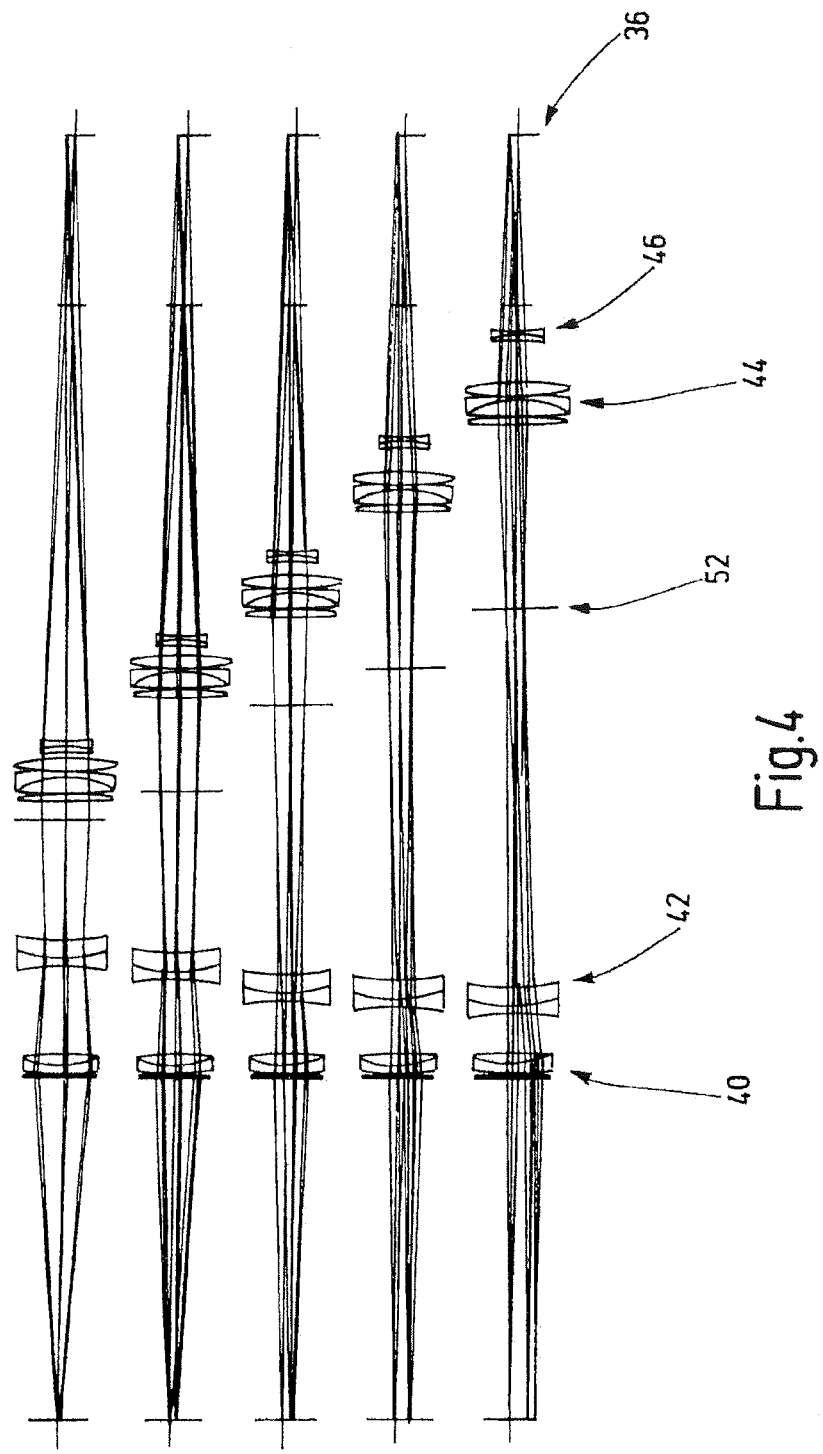
FIG. 4 shows a further sectional view of the objective from FIG. 2 with five different operating positions representing five different magnifications with a different operating distance from that in FIG. 3.
Figure 5:
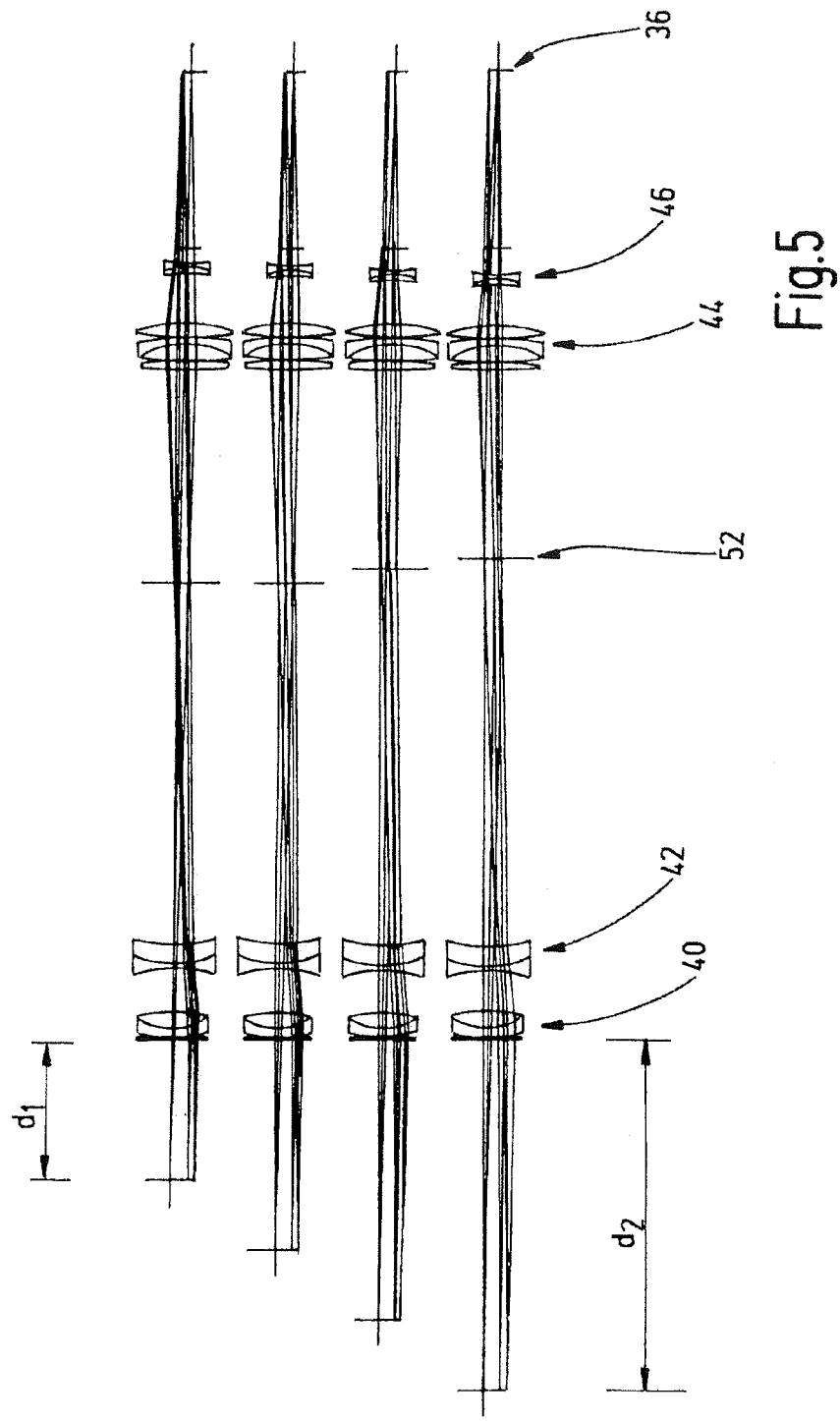
FIG. 5 shows a further sectional view of the objective from FIG. 2, the illustration showing the position of the lens-element groups along the optical axis with in each case the same magnification for five different operating distances.

FIGS. 3 to 5 illustrate the positions of the lens-element groups 40, 42, 44, 46 and the position of the diaphragm 52 for different operating distances d and different magnifications. As can be discerned on the basis of the sectional views, each lens-element group has a plurality of lens elements 97, 98, wherein, in this exemplary embodiment, at least one cement element consisting of at least two lens elements 97, 98 is used in each lens-element group. Some of the lens-element groups have further separate lens elements. At a high magnification, the second and third lens-element groups are close together, wherein the actual distance between the second and third lens-element groups is additionally dependent on the operating distance d. As can be discerned on the basis of FIG. 3, the second and third lens-element groups are closer together in the case of a relatively small operating distance d than in the case of a relatively large operating distance.

With decreasing magnification, the second and third lens-element groups move apart from one another, the second lens-element group approaching the first lens-element group. At the high magnification, the first and second lens-element groups focus a "virtual" image formed by the measurement object upstream of the diaphragm 52. The fourth lens-element group acts as a projective system in this case. It shifts the image into the plane of the image sensor 36. With decreasing magnification, the image formed by the first and second lens-element groups moves further away from the diaphragm. The third and fourth lens-element groups approach one another and with joint positive refractive power image the virtual image onto the plane of the image sensor 36.

In all preferred exemplary embodiments, the diaphragm 52 in each case follows the focal point of the subsystem formed from the first and second lens-element groups. This enables a good field correction with the aid of the third and fourth lens-element groups.

In one preferred exemplary embodiment, a measurement object is arranged at a distance of between 0.8 and two times the focal length of the lens-element group 1. The first lens-element group has a positive refractive power. The second lens-element group has a negative refractive power. The third lens-element group has a positive refractive power, and the fourth lens-element group once again has a negative refractive power. The second, third and fourth lens-element groups are in each case achromatically corrected, while the first lens-element group produces a defined longitudinal chromatic aberration. The diaphragm 52 is situated in each case at the image-side focal point of the subsystem formed from the first and second lens-element groups. A corresponding control curve for the axial position of the diaphragm 52 ensures an object-side telecentricity. The change in the diaphragm diameter allows an object-side aperture adapted to the respective magnification and object structure. The virtual image formed by the first and second lens-element groups is imaged by the third and fourth lens-element groups to a defined location arranged at a defined fixed distance from the first lens-element group. In the preferred exemplary embodiments, the image sensor 36 is situated at said defined location.

The optional fifth lens-element group transforms the image by a constant absolute value with a scalar proportion of the total magnification. In the preferred exemplary embodiments, the total magnification is real without an intermediate image. The design of the system ensures, over the total magnification range, an exit pupil position relative to the image downstream of the fourth lens-element group between half and double the distance to the measurement object. This is advantageous in order to be able to couple illumination light into the objective 43 via the interface 72 and/or the interface 35 with low losses even without a strict image-side telecentricity.

The focal length of the subsystem formed from the first and second lens-element groups increases towards larger object fields and the diaphragm 52 tracks the lens-element groups moving in the direction of the image sensor 36. In this case, the beam heights at the third and fourth lens-element groups are limited on account of the diaphragm, which enables a good overall correction of the imaging. The overall system is underdetermined by the paraxial basic data of magnification, focussing, telecentricity and numerical aperture. With the aid of the control curve for the axial position of the diaphragm, it is possible to achieve a balanced correction of the image aberrations over a large adjustment range of the magnification. In some exemplary embodiments, the ratio between maximum magnification and minimum magnification is greater than 10 and preferably greater than 15.

In the preferred exemplary embodiments, the objective 43 can have transverse chromatic aberrations in order to enable a simple and cost-effective construction. This has the consequence that light and images of different colours can have a small offset transversely with respect to the optical axis 50. In preferred exemplary embodiments, the transverse chromatic aberration is corrected on the basis of mathematical correction calculations, which is possible in the preferred exemplary embodiments because the aberration image as such is continuous.

In some exemplary embodiments of the objective 43, the beam splitter 64 and the cover glass 38 are embodied such that a polarization-optical suppression with extraneous light is achieved. For this purpose, the beam splitter 64 is embodied as a polarizing beam splitter, and the cover glass 38 is a λ/4 plate. In this way, light that arises for example as a result of internal reflections in the objective body is deflected by the beam splitter 64. Only light that passed with outgoing and return path through the λ/4 plate was rotated in each case by 45° in the direction of polarization and can then pass through the beam splitter 64 by virtue of the direction of polarization rotated by 90° in total in the direction of the camera 34.

In preferred exemplary embodiments, mount parts of the lens-element groups are blackened, and the lens-element interfaces are provided with antireflection coatings. Interfaces of adjacent lens elements are cemented as much as possible. The individual assemblies are weight-optimized in order to enable rapid movements of the movable lens-element groups and diaphragm.

Figure 6:
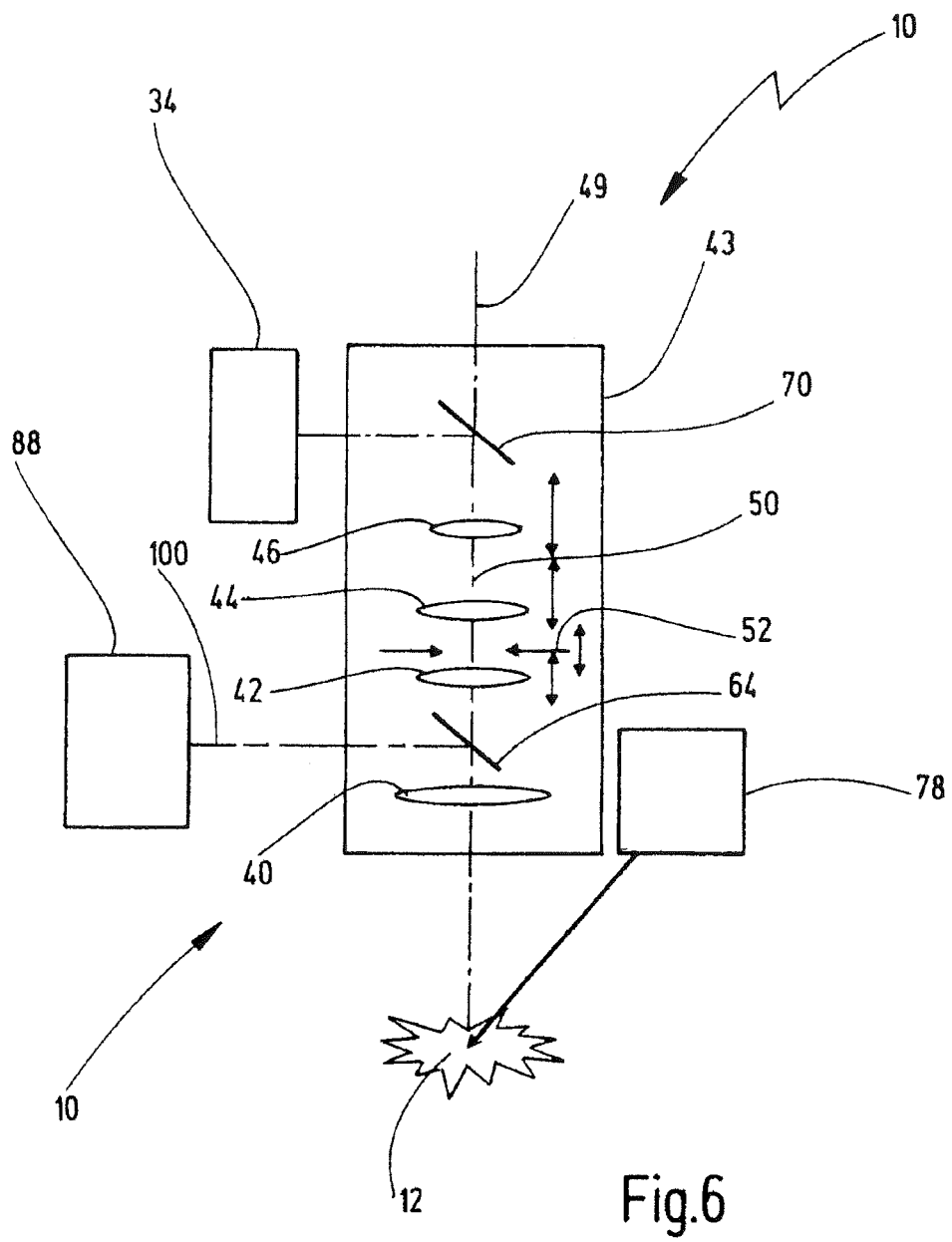
FIG. 6 shows a schematically illustrated exemplary embodiment of a coordinate measuring machine.

FIG. 6 shows a schematic exemplary embodiment of a coordinate measuring machine 10. In this case, identical elements are identified by identical reference signs and will not be explained in detail again below.

The coordinate measuring machine 10 serves for measuring an object 12. For this purpose, a camera 34 is provided, onto which the measurement object 12 is imaged by means of the objective 43. A light source 78 is provided for illuminating the measurement object 12. In the exemplary embodiment illustrated, the light source 78 irradiates the measurement object 12 at an angle with respect to the longitudinal direction 49 or the optical axis 50. However, this need not necessarily be the case. The light source 78 can also be a reflected-light illumination confocally with respect to the longitudinal direction 49 or a transmitted-light illumination, as has already been described above. In the exemplary embodiment illustrated, the camera 34 is coupled into the objective by means of a beam splitter 70 or in this case a reflective optical element. In principle, however, this arrangement of the camera 34 should also be understood to be merely by way of example. The camera 34 can equally be arranged concentrically with the longitudinal axis 49.

A first lens-element group of the objective 43 is arranged in a fixed fashion, i.e. it is not movable along the longitudinal direction 49. Furthermore, in the exemplary embodiment illustrated, the second, third and fourth lens-element groups 42, 44, 46 and the diaphragm 52 arranged between the second lens-element group 42 and the third lens-element group 44 are provided.

A coupling element 64 can selectively be coupled in between the first lens-element group 40 and the second lens-element group 42, which coupling element can be embodied either as a beam splitter or as a mirror. In the case of the embodiment of a beam splitter, as illustrated in the example in FIG. 6, it enables a simultaneous use of the camera 34 and the white light sensor 88. The white light sensor 88 is coupled into the beam path of the objective 43 by means of the coupling element 64. In this way, the white light sensor 88 concomitantly uses the stationary first lens-element group 40 of the objective 43. A beam path 100 to the white light sensor 88 is thus coupled onto the longitudinal axis 49 of the objective 43 by means of the coupling element 64.

Figure 7:
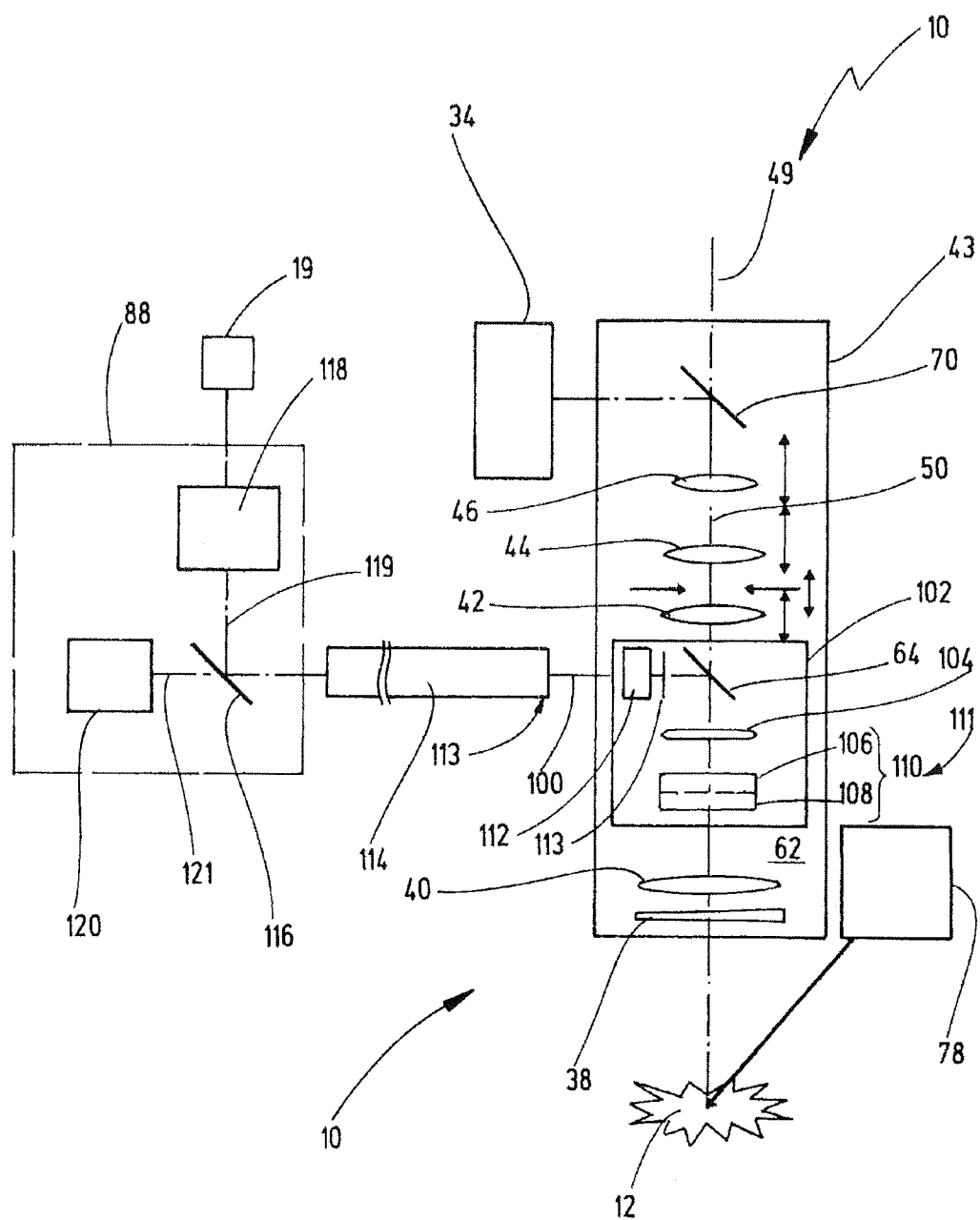
FIG. 7 shows a further schematically illustrated exemplary embodiment of a coordinate measuring machine.

FIG. 7 schematically illustrates a further exemplary embodiment of the coordinate measuring machine.

In this case, elements identical to those in FIG. 6 are identified by identical reference signs and will not be explained in detail again below.

In the exemplary embodiment illustrated, the white light sensor 88 has a movable or pivotable part 102, which can selectively be introduced into the clearance 62 between the first lens-element group 40 and the second lens-element group 42. As a result, it becomes possible to couple the beam path 100 of the white light sensor 88 onto the longitudinal axis 49 of the objective 43.

Furthermore, the coordinate measuring machine has a collimation element 104, which is arranged for collimating the convergent or divergent beam of rays between the coupling element 64 and the first lens-element group 40. Furthermore, a chromatic assembly 111 is provided. In the exemplary embodiment illustrated, the chromatic assembly 111 is formed by two optical elements 106, 108. In principle, however, provision can also be made for the chromatic assembly 111 to be formed only by a single dispersion element 110. By way of example, the first optical element 106 and the second optical element 108 can be formed in each case by a refractive optical element. However, diffractive or holographic optical elements can also be provided. If only a single dispersion element 110 is provided, this can be embodied, in particular, as a diffractive optical element. The chromatic assembly 111 serves for introducing a longitudinal chromatic aberration into the beam path 100 of the white light sensor 88 in a targeted manner. Since provision can be made, in particular, for each of the lens-element groups 40, 42, 44, 46 of the objective 43 by itself to be chromatically corrected, a longitudinal chromatic aberration cannot be effected by the first lens-element group 40. The further chromatic assembly 111 is necessary for this purpose. The order of the arrangement of the chromatic assembly 111 and of the collimation element 104 should be understood to be merely by way of example. It can also be chosen the other way round. Particularly if the collimation element 104 is arranged near the first lens-element group 40, it is possible to collimate the divergent or convergent beam of rays with a relatively small cross-sectional diameter. This makes it possible to embody the chromatic assembly 111, the coupling element 64 and a beam guiding optics 112 with relatively small diameters.

The beam guiding optics 112 serves for coupling the light portion coupled out by the coupling element 64 or the coupled-out light into an optical fibre 114.

In principle, it can be provided that the collimation element 104 and the chromatic assembly 111 together with the coupling element 64 can be introduced into the clearance 62. If a plurality of chromatic assemblies 111 are provided, they can also be introducible into the clearance 62 independently of the coupling element 64 and the collimation element 104; this can make it possible selectively for one of a plurality of chromatic assemblies 111 to be coupled into the beam path in order thus to predetermine in a targeted manner the amount of longitudinal chromatic aberration brought about or the vertex focal length difference over the wavelength spectrum used.

The beam guiding optics 112, too, can in principle selectively be introducible into the beam path together with the coupling element 64. Moreover a lens-side end 113 in the optical fiber 114 can in principle be pivotable only together with the coupling element 64 into the clearance 62. However, provision can also be made for the end 113 to be arranged in a fixed fashion, as illustrated. Furthermore, in principle, provision can also be made for the beam guiding optics 112 to be arranged. The optical fiber 114 guides the light towards the white light sensor 88. By means of a beam splitter 116, the light is split into a beam path 119 towards an evaluation unit 118 of the white light sensor 88 and into a beam path 121 towards a light source 120 of the white light sensor 88. In this way, it is possible to reflect the incident light into the evaluation unit 118 by means of the beam splitter 116. At the same time, the desired illumination can be effected by the rear side of the beam splitter 116. Furthermore, provision can also be made, in principle, for enabling the light from the light source to be directly coupled into the evaluation unit 118 by pivoting of the beam splitter 116, without the light actually being guided through the optical fibre 114 and onto the measurement object 12. In this way, the incident spectrum can be measured precisely in a simple manner. By way of example, it becomes possible in this way to carry out an evaluation standardized with regard to the incident spectrum of the light source 120, such that temporal variations of the incident spectrum of the light source 120 can be taken into account in the evaluation. Furthermore, the chromatic white light sensor 88 usually has a confocal diaphragm 113, which serves for optimizing the resolution of the white light sensor 88. The diaphragm 113 can be coupled to the beam guiding optics 112, for example. It can for example also be provided at an entrance or exit opening of the optical fiber 114, if the optical fiber 114 is provided. A different position in the beam path 100 is also possible.

The evaluation unit 118 can be coupled to the evaluation and control unit 19 of the coordinate measuring machine or even be a part of said unit. However, the evaluation unit 118 can also be present separately, in principle. The separate representation with different blocks is for illustration purposes.

Furthermore, in the exemplary embodiment illustrated, the coordinate measuring machine 10 can also have the cover glass 38, which acts as described in connection with FIG. 3.

Figure 8:
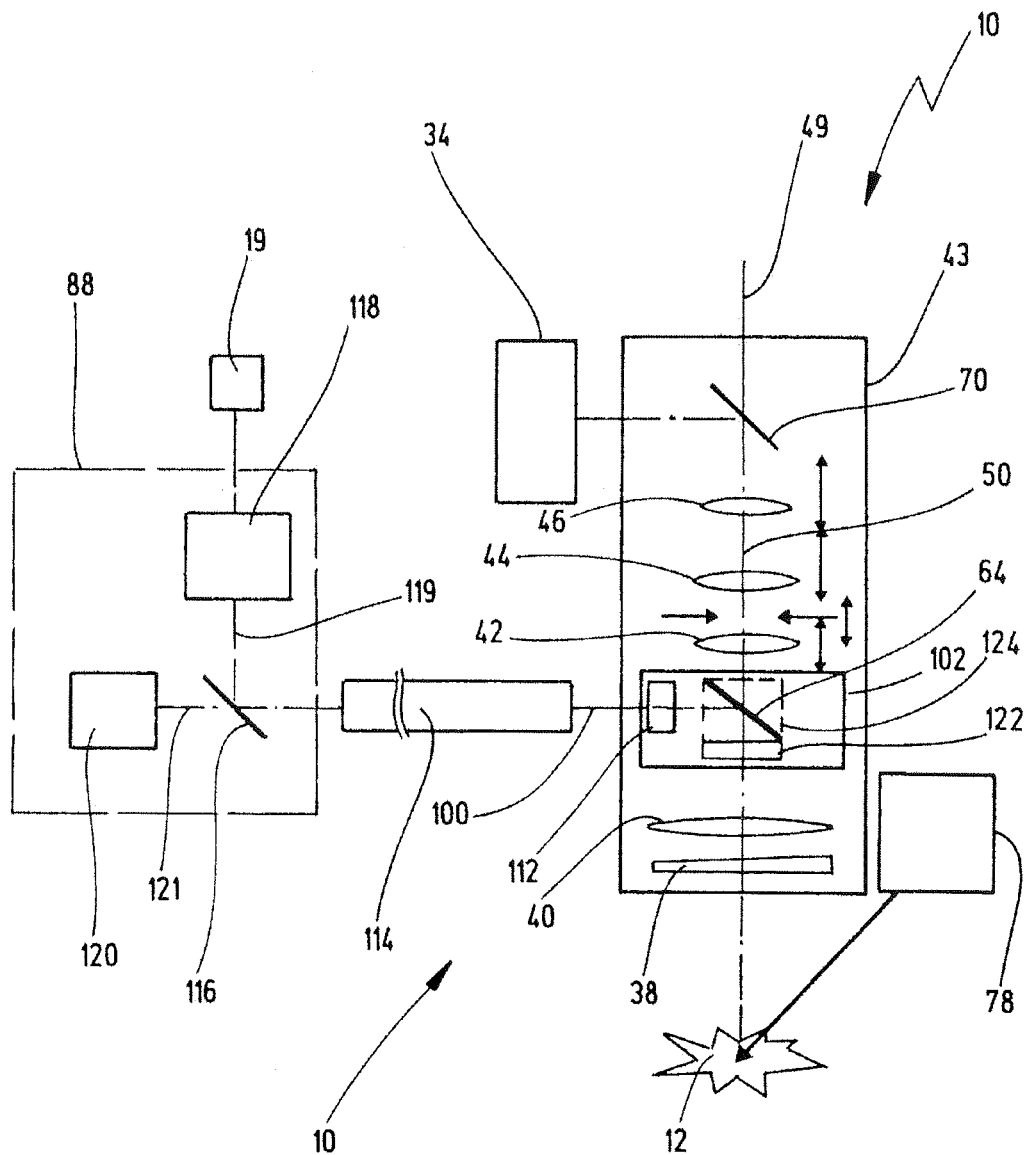
FIG. 8 shows yet another schematically illustrated exemplary embodiment of a coordinate measuring machine.

FIG. 8 illustrates a further exemplary embodiment of the coordinate measuring machine 10. Identical elements are once again identified by identical reference signs and will not be explained again.

The exemplary embodiment illustrated functions, in principle, as already described in the preceding example with regard to FIG. 7.

The embodiment illustrated in FIG. 8 enables a shorter axial design of the objective or a better utilization of the clearance 62 between the first lens-element group 40 and the second lens-element group 42. For this purpose, the coordinate measuring machine 10 has a diffractive optical element 122, which is preferably embodied as a blazed grating. By means of such a diffractive optical element, the latter can simultaneously undertake the function of the dispersion element, of the collimation element or of the chromatic assembly 111 and of the collimation element 104. Consequently, only a single element 122 is provided, which forms the dispersion element 110 and the collimation element 104. A diffractive optical element can be designed, in principle, such that it has the desired refraction properties and dispersive properties. The use of a blazed grating, in particular, furthermore makes it possible to maximize the diffraction efficiency of the diffractive optical element for a specific wavelength range used by the light source 120.

As is indicated by dashed lines, the diffractive optical element 122 can additionally be embodied as a component 124 that also combines in itself the reflective properties of the coupling element 64. A particularly compact design of the entire objective 43 is made possible in this way. In this case, the geometrical arrangement of the diffractive optical element 122 or 124 should be understood to be merely by way of example and serves only for explanation purposes.

In principle, there is also the possibility of implementing the desired dispersive properties and collimating properties and optionally also the reflective properties by means of a single holographic element.

What is claimed is:

1. Coordinate measuring machine for measuring a measurement object, comprising a workpiece support for supporting the measurement object and a measuring head carrying an optical sensor, wherein the measuring head and the workpiece support are movable relative to one another, wherein the optical sensor has a objective and a camera, which is designed to capture an image of the measurement object through the objective, wherein the objective has a light entrance opening and a light exit opening optically coupled to the camera, wherein the objective has a multitude of lens-element groups which are arranged in the objective between the light entrance opening and the light exit opening one behind another along a longitudinal axis of the objective, and wherein a first lens-element group from the multitude of lens-element groups is arranged in a stationary fashion in the region of the light entrance opening, wherein there is a clearance in the objective along said longitudinal axis between the first and a second lens-element groups, and wherein the coordinate measuring machine furthermore comprises a white light sensor and an at least partly reflective coupling element optically coupled to the white light sensor, said coupling element being selectively movable into the clearance to selectively couple the white light sensor into the objective between the first and second lens-element groups.

2. Coordinate measuring machine according to claim 1, wherein the coordinate measuring machine has a collimation element between the first lens-element group and the coupling element.

3. Coordinate measuring machine according to claim 2, wherein the collimation element has at least one optical element selected from a group consisting of a refractive optical element, a diffractive optical element and a holographic optical element.

4. Coordinate measuring machine according to claim 2, wherein the collimation element is movable together with the coupling element.

5. Coordinate measuring machine according to claim 1, wherein the coordinate measuring machine furthermore has a beam guiding optics for guiding light from the coupling element to the white light sensor.

6. Coordinate measuring machine according to claim 5, wherein the beam guiding optics is movable together with the coupling element and guides light from the coupling element into an optical fiber arranged in such a way that it optically connects the beam guiding optics to an evaluation unit and a light source of the white light sensor.

7. Coordinate measuring machine according to claim 6, wherein the white light sensor has a beam splitter, which combines a beam path of light emitted by the light source and a beam path of light incident on the evaluation unit.

8. Coordinate measuring machine according to claim 1, wherein the first lens-element group is embodied in an achromatic fashion.

9. Coordinate measuring machine according to claim 1, wherein each lens-element group of the multitude of lens-element groups of the objective is embodied in an achromatic fashion.

10. Coordinate measuring machine according to claim 1, wherein the coordinate measuring machine furthermore has at least one chromatic assembly which is movable into the clearance.

11. Coordinate measuring machine according to claim 10, wherein the at least one chromatic assembly consists of a single dispersion element for bringing about a longitudinal chromatic aberration.

12. Coordinate measuring machine according to claim 11, wherein the dispersion element is a diffractive optical element or a holographic optical element.

13. Coordinate measuring machine according to claim 1, wherein the objective has a diaphragm and at least four lens-element groups, and wherein the diaphragm and the second lens-element group, a third lens-element group and a fourth lens-element group from the at least four lens-element groups are displaceable relative to the first lens-element group along the longitudinal axis, wherein the second lens-element group is arranged between the first lens-element group and the diaphragm, and wherein the third and fourth lens-element groups are arranged between the diaphragm and the light exit opening.

14. Coordinate measuring machine according to claim 13, wherein the first, second, third and fourth lens-element groups in each case consist of at least two lens-elements.

15. Coordinate measuring machine according to claim 1, wherein at least two lens-element groups are displaceable parallel to the longitudinal axis.

16. Coordinate measuring machine according to claim 1, wherein the objective has a separate cover glass, which is arranged upstream of the first lens-element group in the region of the light entrance opening.

17. Coordinate measuring machine according to claim 12, wherein the coordinate measuring machine has a collimation element between the first lens-element group and the coupling element, and wherein the coordinate measuring machine has a diffractive or holographic optical element that forms both the collimation element and the dispersion element.

* * * * *